US009304984B2

(12) United States Patent
Castellanos et al.

(10) Patent No.: US 9,304,984 B2
(45) Date of Patent: Apr. 5, 2016

(54) INTENTION STATEMENT VISUALIZATION (75) Inventors: Maria G. Castellanos, Sunnyvale, CA (US); Riddhiman Ghosh, Sunnyvale, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 591 days.

(21) Appl. No.: 13/429,741

(22) Filed: Mar. 26, 2012

(65) Prior Publication Data
US 2013/0253907 A1 Sep. 26, 2013

(51) Int. Cl.
*G06F 17/27* (2006.01)
(52) U.S. Cl.
CPC ........................................ *G06F 17/27* (2013.01)
(58) Field of Classification Search
CPC .............. G06F 17/30867; G06F 17/30734; G06F 17/30716; G06F 17/30994; G06F 8/34; G06F 17/2785; G06F 17/28; G06F 17/30976; G06F 17/30657
USPC ........................................ 704/1–10; 707/750
See application file for complete search history.

(56) References Cited

U.S. PATENT DOCUMENTS

| 6,505,167 | B1 * | 1/2003 | Horvitz et al. ............... 705/7.21 |
| 6,665,661 | B1 * | 12/2003 | Crow et al. |
| 7,720,835 | B2 | 5/2010 | Ward et al. |
| 7,756,755 | B2 | 7/2010 | Ghosh et al. |
| 8,612,432 | B2 * | 12/2013 | Kenthapadi et al. .......... 707/731 |
| 2004/0205643 | A1 | 10/2004 | Harrington |
| 2005/0165607 | A1 * | 7/2005 | Di Fabbrizio et al. ........ 704/256 |
| 2007/0043770 | A1 * | 2/2007 | Goodrich et al. .......... 707/104.1 |
| 2007/0118514 | A1 | 5/2007 | Mariappan |
| 2007/0282826 | A1 * | 12/2007 | Hoeber et al. ..................... 707/5 |
| 2008/0104061 | A1 | 5/2008 | Rezaei |
| 2008/0215543 | A1 * | 9/2008 | Huang et al. ....................... 707/3 |
| 2010/0030552 | A1 * | 2/2010 | Chen et al. ......................... 704/9 |
| 2010/0049538 | A1 * | 2/2010 | Frazer et al. ..................... 705/1 |
| 2010/0205180 | A1 * | 8/2010 | Cooper et al. ................ 707/740 |
| 2011/0029636 | A1 | 2/2011 | Smyth et al. |
| 2011/0153654 | A1 * | 6/2011 | Lee .............................. 707/769 |
| 2011/0225115 | A1 | 9/2011 | Moitra et al. |

(Continued)

FOREIGN PATENT DOCUMENTS

| JP | 2002140346 A | 5/2002 |
| JP | 2004078540 | 3/2004 |

(Continued)

OTHER PUBLICATIONS

Liu, Bing, Minqing Hu, and Junsheng Cheng. "Opinion observer: analyzing and comparing opinions on the web." Proceedings of the 14th international conference on World Wide Web. ACM, 2005.*

(Continued)

*Primary Examiner* — Matthew Baker
(74) *Attorney, Agent, or Firm* — Trop, Pruner & Hu, P.C.

(57) ABSTRACT

An example system includes an extraction module, an intention processing module, and an intention visualization module. The extraction module is configured to ingest textual data from a text source. The intention processing module is configured to process the textual data and identify one or more intention statements within the textual data. The intention visualization module is configured to provide an interactive interface that facilitates filtering and visualization of aspects of the one or more intention statements.

23 Claims, 10 Drawing Sheets

(56) References Cited

U.S. PATENT DOCUMENTS

| | | | |
|---|---|---|---|
| 2011/0238409 A1* | 9/2011 | Larcheveque et al. | 704/9 |
| 2011/0295694 A1* | 12/2011 | Coggeshall et al. | 705/14.66 |
| 2011/0302124 A1* | 12/2011 | Cai et al. | 706/52 |
| 2011/0302162 A1* | 12/2011 | Xiao et al. | 707/724 |
| 2012/0089642 A1* | 4/2012 | Milward et al. | 707/776 |
| 2012/0131021 A1* | 5/2012 | Blair-Goldensohn et al. | 707/750 |
| 2012/0253791 A1* | 10/2012 | Heck | G06F 17/30867 704/9 |
| 2012/0317049 A1* | 12/2012 | Hao et al. | 705/347 |
| 2013/0253907 A1 | 9/2013 | Castellanos et al. | |
| 2014/0108455 A1* | 4/2014 | Castellanos et al. | 707/776 |

FOREIGN PATENT DOCUMENTS

| | | |
|---|---|---|
| JP | 2004334602 A | 11/2004 |
| JP | 2010122823 A | 6/2010 |
| JP | 2010224813 A | 10/2010 |
| KR | 10-2004-0087535 | 10/2004 |
| KR | 10-2005-0061369 | 6/2005 |
| KR | 10-2011-0070057 | 6/2011 |
| WO | WO-2013002771 | 1/2013 |

OTHER PUBLICATIONS

Yatani, Koji, et al. "Review spotlight: a user interface for summarizing user-generated reviews using adjective-noun word pairs." Proceedings of the SIGCHI Conference on Human Factors in Computing Systems. ACM, 2011.*

Oelke, Daniela, et al. "Visual opinion analysis of customer feedback data."Visual Analytics Science and Technology, 2009. VAST 2009. IEEE Symposium on. IEEE, 2009.*

Wu, Yingcai, et al. "OpinionSeer: interactive visualization of hotel customer feedback." Visualization and Computer Graphics, IEEE Transactions on 16.6 (2010): 1109-1118.*

Dayong Wu; Yu Zhang; Shiqi Zhao; Ting Liu, "Identification of Web Query Intent Based on Query Text and Web Knowledge," Pervasive Computing Signal Processing and Applications (PCSPA), 2010 First International Conference on , vol., No., pp. 128,131, Sep. 17-19, 2010.*

Jeanquartier, Fleur, Mark Kröll, and Markus Strohmaier. "Intent Tag Clouds: An Intentional Approach to Visual Text Analysis." (2009).*

Castellanos, Malu, et al. "Intention insider: discovering people's intentions in the social channel." Proceedings of the 15th International Conference on Extending Database Technology. ACM, 2012.*

Yin, Xiaoxin, and Sarthak Shah. "Building taxonomy of web search intents for name entity queries." Proceedings of the 19th international conference on World wide web. ACM, 2010.*

Guo, Yi, et al.; "Implicit Customer Relations Mining with the Event-indexing Model"; Jun. 6-7, 2009; 4 pages.

Kroll, Mark, et al., "Analyzing Human Intentions in Natural Language Text"; Sep. 1-4, 2009; pp. 197-198.

Song, Insu, et al.: "Intention Extraction from Text Messages"; 2010; pp. 330-337.

Non-Final OA dated Sep. 28, 2015 cited in U.S. Appl. No. 14/003,140; 15 pages.

* cited by examiner

┌─────────────────────────────┐
│ Extraction module ingests textual │
│ data from text source │
│ 310 │
└─────────────────────────────┘
              │
              ▼
┌─────────────────────────────┐
│ Intention processing module │
│ processes textual data and │
│ identifies intention statements │
│ 320 │
└─────────────────────────────┘
              │
              ▼
┌─────────────────────────────┐
│ Intention processing module │
│ extracts aspects from the │
│ intention statements │
│ 330 │
└─────────────────────────────┘

INTENTION STATEMENT VISUALIZATION

BACKGROUND

With the increase in forums, blogs, and social networking websites, people are more and more willing to share information regarding their intentions for future activities. For example, people commonly share their intentions regarding potential vacation itineraries in online forums (e.g., Lonely Planet.com) or social media websites (e.g., Facebook.com and Twitter.com) to solicit advice from others who may have conducted the same or similar activities and can provide helpful insight. Such insight is often more candid and relevant than the information provided in travel guides, and therefore a growing number of people have been utilizing this form of information gathering to help prepare for future endeavors.

BRIEF DESCRIPTION OF THE DRAWINGS

Example embodiments are described in the following detailed description and in reference to the drawings, in which.

DETAILED DESCRIPTION

Various embodiments of the present disclosure are directed to the exploration of intention statements in a manner that is efficient, effective, and intuitive. More specifically, various embodiments are directed to an intention analysis tool that enables exploration of gathered intention information via an interactive graphical user interface.

By way of background, the text within websites, call center surveys, documents, emails, and/or transcripts often contains valuable intention information that may be utilized within commerce to provide better products and/or services to consumers, enhance customer relations, create personalized marketing campaigns, and, in general, capitalize on an understanding of consumers' intentions. In particular, knowing such consumer intent information allows companies to remain competitive and/or obtain a competitive edge over their competitors. For example, if an author of an online forum dialog expresses the intention to take a vacation to the Caribbean in the near future, a travel agency may exploit that intent information for a potential economic gain by providing the author with targeted Caribbean travel information. Of course, this assumes that the travel agency is first able to locate the author's dialog among the plethora of information available on the web. This task is difficult if not impossible because of the incalculable amount of online text available for data mining, and the pace at which such message streams are created.

Various embodiments of the present disclosure address at least the above by providing a tool that ingests content from online sources and/or from uploaded files, and quickly sifts through the content to extract intention statements and/or attributes of the intention statement. The intention statements and/or their attributes may be loaded into a data warehouse such that queries may be performed to produce interactive reports and dynamic visualizations that facilitate intuitive exploration at detailed and aggregate levels. As described in detail below with respect to various example embodiments and figures, this novel and previously unforeseen tool enables businesses or other entities to efficiently and effectively explore intention statements and to capitalize on the information gleaned.

In one example embodiment of the present disclosure, a system is provided. The system comprises an extraction module, an intention processing module, and an intention visualization module. The extraction module is configured to ingest textual data (e.g., user-generated online content) from a text source (e.g., an online forum). The intention processing module is configured to process the textual data and identify one or more intention statements within the textual data and extract their elements. The intention visualization module is configured to provide an interactive interface that facilitates exploration of the intention analysis results by filtering (e.g., based on syntax patterns) and visualization (e.g., in the form of a nodal chart or tag cloud) of aspects of the one or more intention statements.

In a further example embodiment, another system is provided. The system comprises an intention visualization module configured to present intention statement information extracted from textual data (e.g., originating from an online forum or a social networking website) via a graphical user interface, wherein the graphical user interface facilities exploration of the intention analysis results by filtering the intention statement information, generating one or more interactive nodal charts based at least in part on the intention statement information, generating one or more reports based at least in part on the intention statement information, and reviewing text associated with the intention statement information.

In still another example embodiment, a non-transitory computer-readable medium is provided. The non-transitory computer-readable medium comprises instructions that when executed cause a system to (i) process textual data and extract one or more intention statements within the textual data; (ii) store the one or more intention statements; (iii) receive a query directed to the one or more intention statements; (iv) locate the one or more intention statements that match the query; and (v) output the one or more intention statements that match the query.

Figure 1:
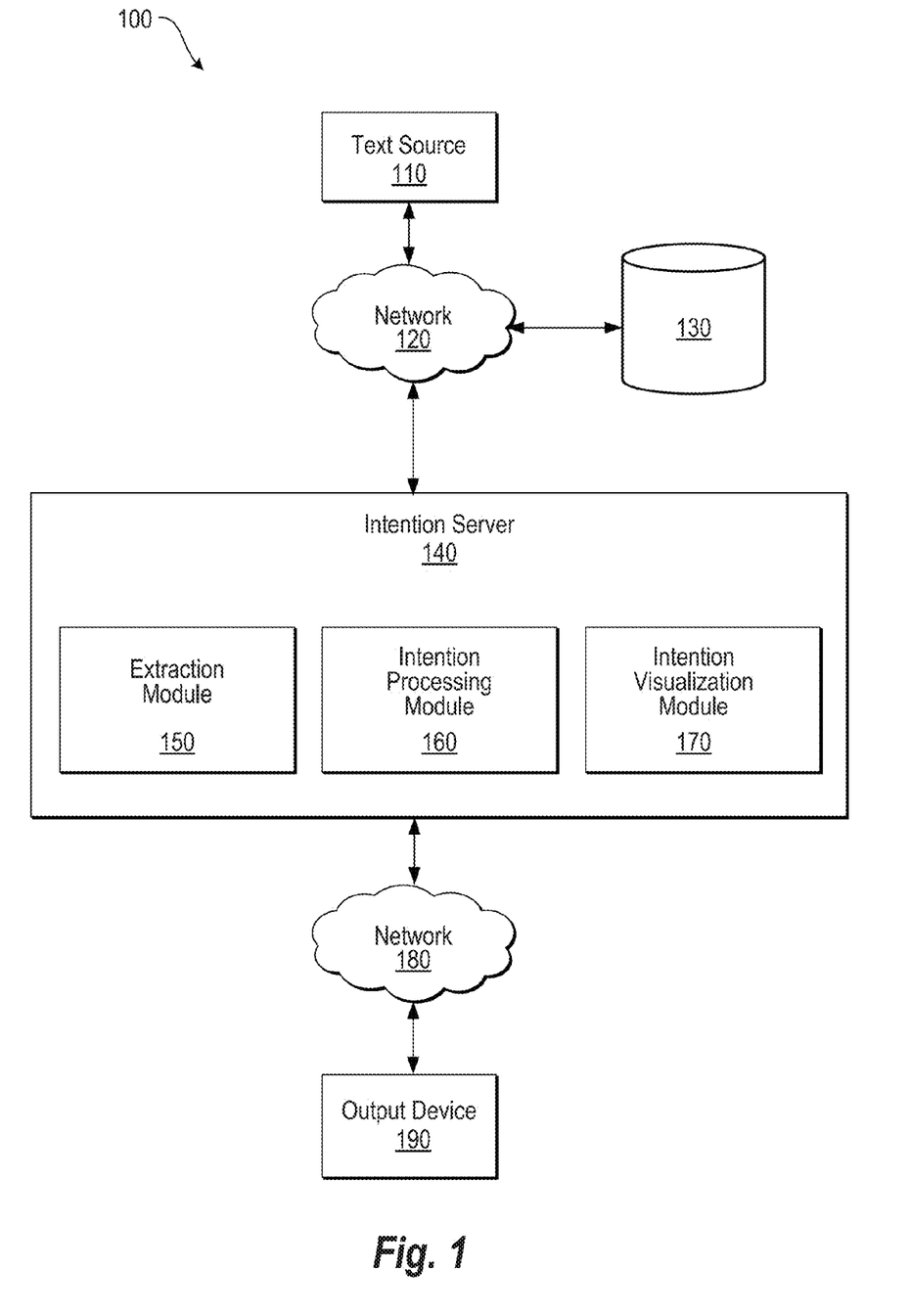
FIG. 1 depicts a system in accordance with an embodiment.

FIG. 1 depicts a system 100 in accordance with an embodiment. It should be readily apparent that the system 100 represents a generalized illustration and that other components may be added or existing components may be removed, modified, or rearranged without departing from the scope of the system 100.

The system 100 comprises a text source 110, a first network 120, a database 130, an intention server 140, a second network 180, and an output device 190. For the purposes of simplicity in illustration, the various system components are shown as separate devices. It should be understood, however, that one or more system components may be integrated with one another. For example, database 130 and intention server 140 may be integrated into a single computing device. Similarly, the first network 120 and second network 180 may be the same network. Still further, the intention server 140, database 130, and output device 190 may be integrated into a single computing device.

The text source 110 is generally the resource that "provides" textual data. As used herein, "provides" is to be interpreted broadly to mean that the text source outputs such data and/or allows such data to be obtained. In some embodiments, such textual data is obtained or ingested via adaptors (e.g., via a web crawl or other similar process) or through a file upload. In one embodiment, this text source 110 may be one or more web servers that host a website (e.g., web server(s) that hosts Twitter or Facebook). In another embodiment, the text source 110 may be an email server that stores emails. In still another embodiment, the text source 110 may be a database that stores text from, e.g., survey results, transcripts, documents, emails, archived data, forums, blogs, websites, speeches, or the like. In yet another embodiment, the text source 110 may be a storage medium that stores files. For example, the storage medium may be a flash drive, hard drive, disk drive, CD-ROM, or the like with text stored thereon. The text source 110 may provide the textual data directly or indirectly to the intention server 140. For example, the text source 110 may provide the textual data indirectly via network 120, or directly via a port connection. The text source 110 may also provide the textual data continuously, periodically, or on-demand. In some embodiments, the textual data is provided in real-time as the text is created. Furthermore, depending on the implementation, the text source 110 may provide textual data through adaptors or without adaptors in embodiments. Such adaptors may allow the textual data to be harvested or scraped form the text source. For example, the text source 110 may provide the textual data through an adaptor that uses the source API (e.g., Facebook API), or when the textual data is already in a file, adaptors may not be utilized because the file may simply be uploaded.

The first network 120 and second network 180 may be typical communication networks that enable communication of data. For example, the first network 120 and second network 180 may one or more networks including, but not limited to, wired/wireless networks, local area networks (LANs), wide area network (WANs), telecommunication networks, the Internet, an Intranet, computer networks, Bluetooth networks, Ethernet LANs, token ring LANs, Inter-Integrated Circuit (I²C) networks, serial advanced technology attachment (SATA) networks, and/or serial attached SCSI (SAS) networks. Such networks may utilize transmission mediums including, but not limited to, copper, fiber optics, coaxial, unshielded twisted pair, shielded twisted pair, heliax, radio frequency (RF), infrared (IR), and/or microwave.

The intention server 140 is generally one or more computing device(s) configured to ingest textual data from the text source 110 via an extraction module (e.g., via adaptors or a file upload) 150, process the textual data via an intention processing module 160, and provide the textual data for display via the intention visualization module 170. Each of these modules may generally be understood as a series of executable instructions executed by one or more processors associated with the intention server 140. Hence, the intention server 140 may comprise one or more processing devices configured to execute instructions stored in memory. In some embodiments, the modules may comprise one or more modules. For example, the extraction module 150 may comprise an adaptor module configured to harvest data or conduct web scrapes. In some embodiments, the intention server 140 provides a "cloud" service, where features provided by the extraction module 150, intention processing module 160, and/or intention visualization module 170 may be accessible on the intention server 140 by one or more remote computing devices via network connections. In other embodiments, the intention server 140 provides a "local" service, where a user's computing device comprises the intention server 140, and the associated extraction module 150, intention processing module 160, and/or intention visualization module 170 are stored and executed locally on the user's computing device.

The database 130 is generally a data warehouse configured to store and provide access to textual data, intention statements, and/or attributes processed by the intention processing module. For example, the extraction module 150 may ingest textual data from online forums (e.g., via adaptors and/or file uploads) and feed this information to the intention processing module 160. The intention processing module 160 may then pre-process and clean the data before performing natural language processing, intention extraction techniques, and/or attribute extraction techniques on the data. Thereafter, the extracted intention statements may be loaded into the database 130 and correlated with intention attributes such that the database 130 may respond to user queries generated via the interactive intention visualization tool.

The output device 190 is generally a device configured to receive and display information. In some embodiments, the output device 190 may comprise a display connected to the intention server 140. While in other embodiments, the output device 190 may comprise a computing device (e.g., a, laptop, desktop, tablet, and/or smartphone) connected to the intentions server 140 via network 180.

Figure 2:
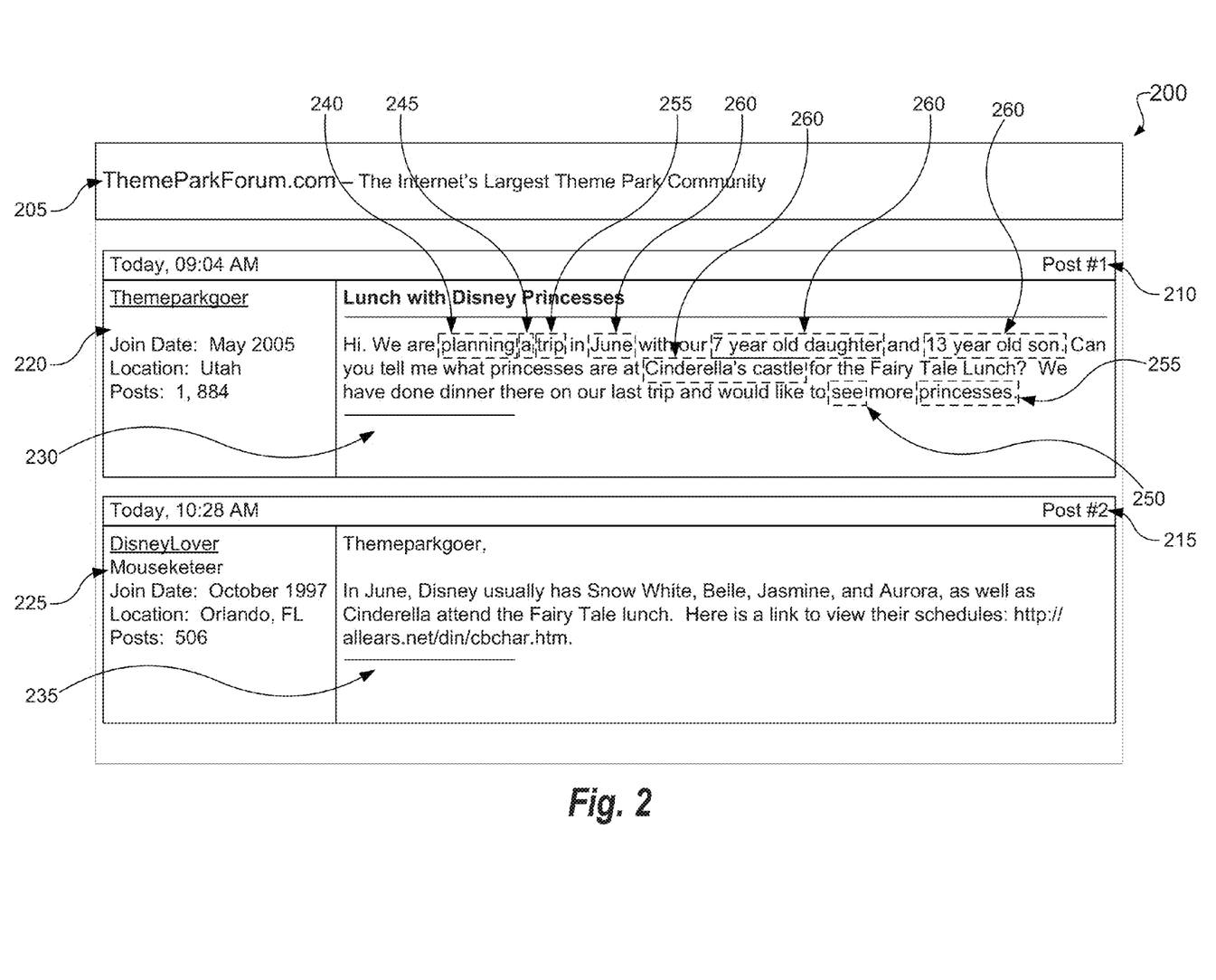
FIG. 2 depicts an online forum including intention text in accordance with an embodiment.
Figure 3:
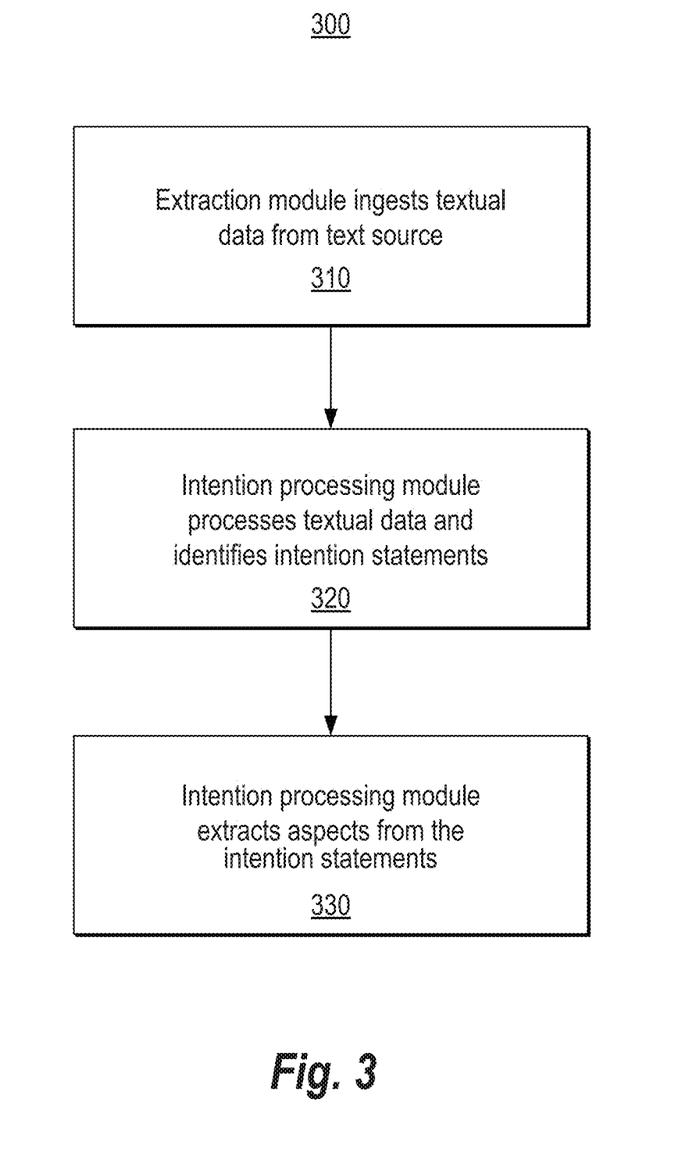
FIG. 3 depicts is a flowchart showing a method of capturing intentions within online text using an extraction module and an intention processing module in accordance with an embodiment.

Turning now to system 100 operations, FIGS. 2 and 3 provide a concise description of the processes associated with the intention extraction processing. Further details of these processes are provided in Assignee's patent application entitled "Capturing Intentions Within Online Text" (PCT/US2011/042218 filed Jun. 28, 2011), which is incorporated herein by reference in its entirety.

FIG. 2 is a diagram of an online forum 200 including text. As depicted, the online forum 200 includes a title 205 and a number of posts (210, 215), each post including an author identifier (220, 225) and associated text (230, 235). Post #1 is the first post within the online forum 200, and the author, "Themeparkgoer," asks a question within the text 230 that she would like answered by others who interact within the online forum 200. In particular, Themeparkgoer asks which princesses will be attending a lunch scheduled at a famous theme park, Disneyland Resorts™. Themeparkgoer's text 230 also includes words or intention statements 230 when she states, "[w]e are planning a trip in June with our 7 year old daughter and 13 year old son," or "would like to see more princesses."

An intention statement is generally any word, group of words, or phrases that mark that there is an intention by an author of the text to perform an action. Some examples of intention phrases include "would like to see," "are planning" or "thinking about doing." The intention phrase may be formed by an intention verb 240 and another object 245 such as, for example, a preposition, or an article. Examples of intention verbs and associated prepositions include, "like to," "planning a," and "thinking about." The intention verb 240 may also be associated with an action verb 250. An action verb 250 is an action intended by the author, such as, for example, "see" in "like to see" as written by the author "Themeparkgoer" of FIG. 2. The intention verb 240 may also be directly associated with an intention object 255. An intention object 255 is the object of the intention of the author such as, for example, "trip" in "planning a trip," or "princesses" in "would like to see more princesses."

Complementary information 260 may also be included in the statement of intention 230, and gives details of the intention of the author. In this example, the complementary information 260 includes: information as to dates such as, for example, "June," number of people participating in the activity such as, for example, approximately 3 or 4 people, demographics of people participating in the activity such as, for example, "7 year old daughter," and "13 year old son," and locations at which the activity is to take place such as, for example, "Cinderella's castle." As discussed further below, such attributes or complimentary information may be used to obtain additional information and reports via queries associated with the interactive intention visualization tool.

The manner in which the system 100 of FIG. 1 identifies the intention statements 230 within online text and extracts elements or aspects of the intention statement (240, 245, 250, 255) will now be described in FIG. 3.

FIG. 3 is a flowchart showing a method 300 of capturing intentions within online text using the extraction module 150 and the intention processing module 160 according to an embodiment. The method 300 may begin at block 310, where the extraction module 150 ingests textual data from the text source 110. This may be accomplished, for example, via extraction module adaptors (e.g., an API and/or web scraping) or by uploading a provided file. For example, and referring to FIG. 2, the text obtained may be text 230 scraped from ThemeParkForum.com.

At block 320, intention processing module 160 may processes the text and identify one or more intention statements within the text 230. In this case, the intention statements identified by the intention processing module 160 would be "planning a trip," and "would like to see more princesses." The intention processing module first identifies the intention verbs 240 and their associated elements 245 "planning a" and "like to." Further, the action verb 250 "see" in "like to see," and the intention objects 255 "trip" in "planning a trip," and "princesses" in "would like to see more princesses" may be identified.

At block 330, the intention processing module 160 extracts a number of attributes 260 of the intention statements. The attributes may include complementary information 260 as indicated above. All the information regarding the statement of intention 230 of FIG. 2 may then be compiled as structured data and transmitted to another computing device (e.g., database 130) for storage.

Turning now to visualization of the intention information, FIGS. 4-9 illustrate an example output of the intention visualization module 170 in the form of an interactive interface in accordance with an embodiment. Among other things, the interactive interface allows a user to explore the intention analysis results by selecting textual data for processing, filtering the textual data, creating nodal charts, creating tag clouds, creating reports, and/or conducting specific intention queries.

Figure 4:
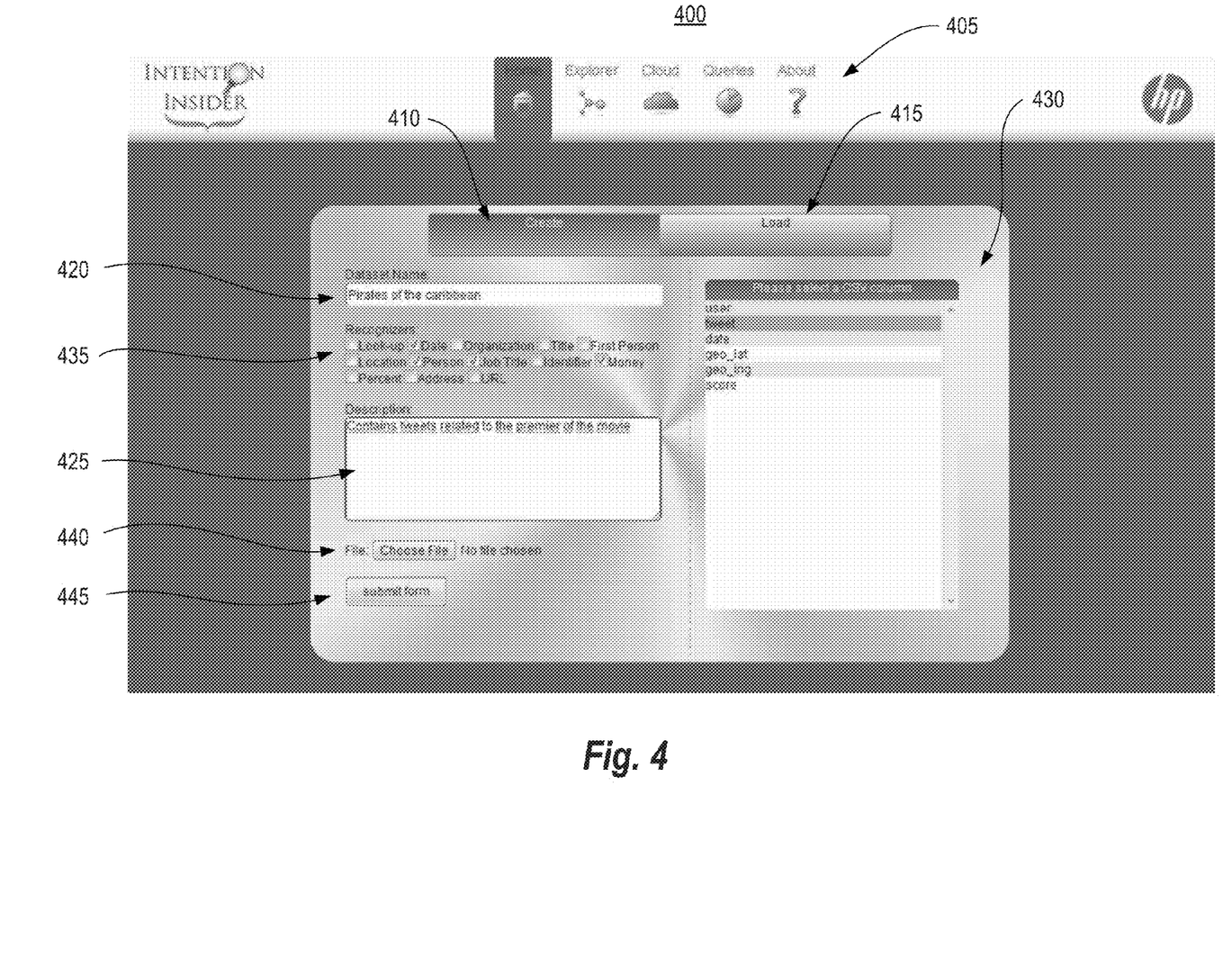
FIG. 4 depicts a first aspect of an interactive interface in accordance with an embodiment.

FIG. 4 depicts a first aspect of the interactive interface in accordance with an embodiment. In particular, FIG. 4 depicts a home or front-panel portion 400 of the interactive intention visualization tool. The top portion of the tool 405 may include five navigation options (i.e., "Home," "Explorer," "Cloud," "Queries," and "About"). The "Home" page shown in FIG. 4 allows a user to load and/or create a file or dataset that the user would like to explore, and further allows the user specify specific parameters associated with the file to process. For example, the intention visualization module may give the user the option to "Create" 410 a new file for visualization based on textual data (e.g., travel forum comments) stored in the database, or, alternatively, the option to "Load" 415 a previously created file. Although not shown on this figure, the home panel may also allow the user to extract data from an online data source.

If the "Create" 410 option is selected, the "Dataset Name" 420 and "Description" 425 is requested in the portion illustrated. In addition, specific columns related to the textual data may need to be selected to perform intention analysis on in the "Please Select a CSV Column" window 430. Such columns may include, for example, "user" (i.e., username) and "tweet" (i.e., text of Twitter message). This metadata along with the data (i.e. the text column as well as the other columns like "date" (i.e., the date of the positing), "geo_lat" (i.e., geographical latitude of message), and/or "geo_lng" (i.e., geographical longitude of message), "location," "email address," "member since") are stored in the database.

Furthermore, "Recognizers" 435 such as "look-up," "date," "organization," "title," "first person," "location," "person," "job title," identifier," "money," "percent," "address," and "URL" may be selected. As mentioned, each intention statement typically includes attributes related to the intention (e.g., "Disneyland," "February," "kids," "$2000 budget.") The selection of recognizers 435 allows a user to focus on selected attributes for analysis and/or reports. For example, if the "date" recognizer is selected, the interactive intention visualization tool will pull information regarding dates (e.g., "February") from the intention information. Similarly, if the "money" recognizer is selected, the interactive intention visualization tool will pull information regarding money (e.g., "$2000 budget") from the intention information. Thus, in general, the recognizers allow a user to select specific attributes in the intention statements that the user would specifically like to obtain detailed information on. It should be understood that different and/or additional recognizers could be included that those shown in FIG. 4 in accordance with various embodiments.

If the "Load" 415 option is selected, the home or front-panel portion 400 of the intention visualization module includes a "Choose File" 440 option to locate and upload a file. The intention visualization module further includes a "Submit Form" option 445 to select once all desired parameters have been selected.

Figure 5:
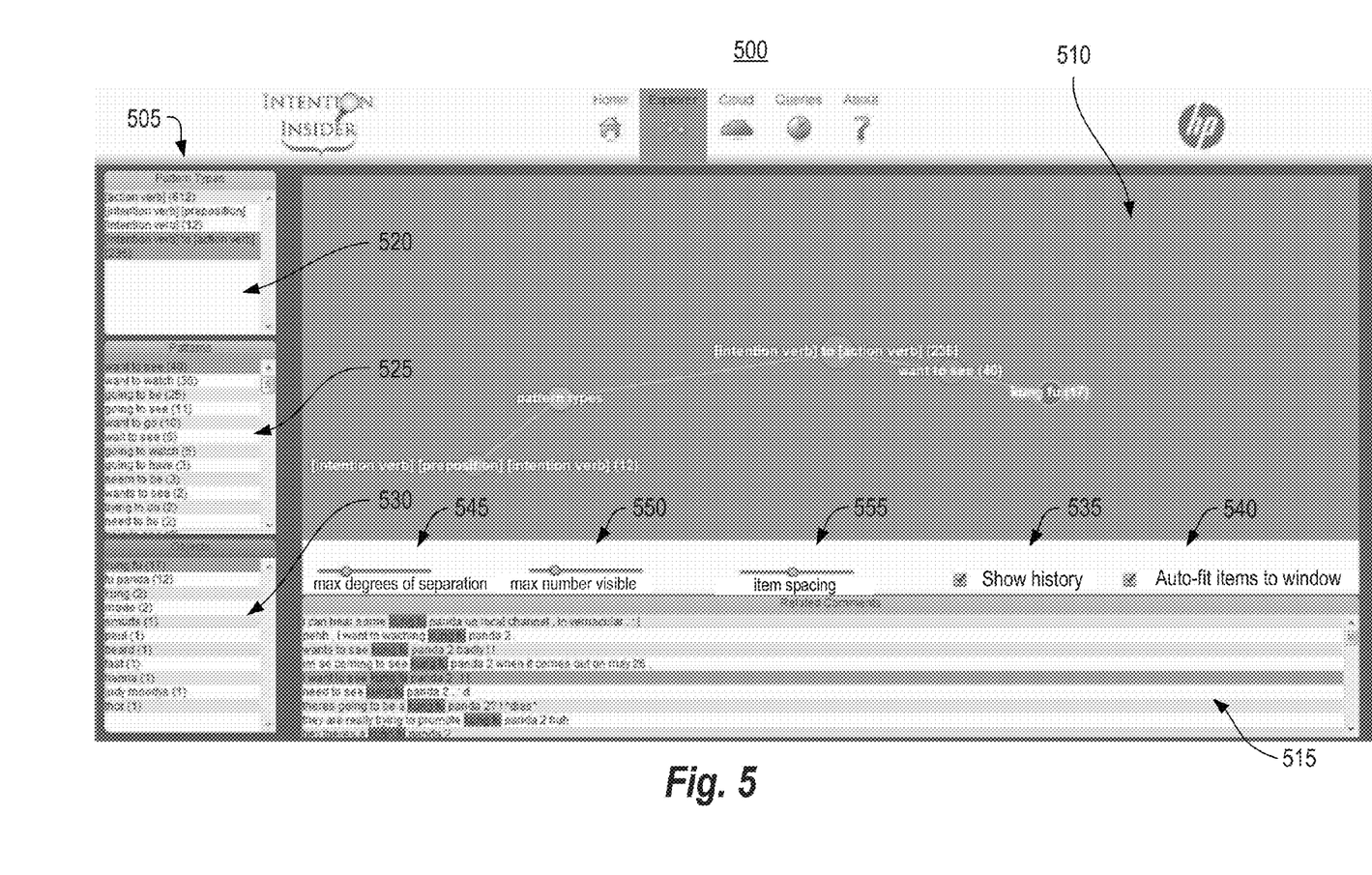
FIG. 5 depicts a second aspect of an interactive interface in accordance with an embodiment.

FIG. 5 depicts a second aspect of the interactive interface in accordance with an embodiment. In particular, FIG. 5 depicts the "Explorer" window 500 which allows the user to explore the results of the processing that was previously selected in the "Home" window depicted in FIG. 4.

The Explorer window 500 generally includes three areas: a filtering area 505, a display area 510, and a related comments area 515. The filtering area 505 includes three options for filtering: "Pattern Types" 520, "Patterns" 525, and "Objects" 530. Each one represents a narrower and/or more refined exploration option. The "Pattern Types" filtering option specifies the various syntax patterns of intention phrases and the number of identified author comments. For example, and as depicted in FIG. 5, the pattern types may include syntax patterns such as (i) [action verbs], (ii) [intention verb] [preposition] [intention verb], and/or (iii) [intention verb] to [action verb]. When one of the pattern types is selected, the "Patterns" 525 filtering window may populate with patterns related to the selected syntax pattern. Similarly, when one of the patterns is selected, the "objects" 530 filtering window may populate with objects related to the selected pattern type and pattern. Thus, as shown in FIG. 5, when the pattern type [intention verb] to [action verb] is selected, patterns with that syntax (e.g., "want to see," "want to watch," "going to be," etc.) are populated in the "Patterns" 525 filtering window. Similarly, when a pattern is selected, objects associated with the selected pattern are populated in the "Objects" 530 filtering window (e.g., "kung fu," "movie," "smurfs," etc.) and the comments containing that pattern are displayed in the "Related Comments" area 515. Finally, when an object is selected, the comments containing the selected pattern and object are displayed in the "Related Comments" area 515. Thus, if a user is interested in exploring author's comments with the "want to see" intention pattern, from the "Objects" 530 filtering window, the user can quickly determine that the "want to see kung fu" was the most highly discussed comment from the source text (e.g., Twitter feeds). In some embodiments, the elements in each filtering area appear sorted by their frequency of appearance in the text data.

The Explorer window 500 further provides a nodal chart related to the selected pattern types, patterns, and/or objects. The nodes may be connected with one another in a parent-child tree format. In addition, the size of each node may be a function of the number of associated comments. For example, the "want to see" node may be a larger node than the "kung fu" node because "want to see" had 40 hits, while "kung fu" had only 12. Furthermore, the color of each node may correspond to the color associated with filtering option. For example, "Pattern Types" 520 may be set to green, "Patterns" 525 may be set to purple, and "Objects" 530 may be set to pink. Thus, each displayed node related to a "Pattern Types" 520 may green, each displayed node related to "Patterns" 525 may be purple, and each displayed node related to "Objects" 530 may be pink. As shown, the nodal chart gives a birds-eye view of the importance and relationships of patterns and objects, where each node is clickable with the same effect explained above for the corresponding element in the filters area.

The display area 510 may be configured to only show current selections, or continue to display information from prior selections (i.e., show historical selections). This display option may be controlled by the "show history" option 535. For example, if the "show history" option is selected, and if a user selects the "kung fu" object then the "smurfs" object and then the "movie" object, all three nodes will be displayed on the display area 510. By contrast, if the "show history" option is not selected, only the most recent selection will be displayed on the display. Thus, continuing the above example, only the "movie" object and its parent patterns and pattern types will be displayed.

Further tools included in the "Explorer" window 500 include an "auto fit to window" selection box 540, a "max degree of separation" slide bar 545, a "max number visible" slide bar 550, and an "item spacing" slide bar 555. The "auto fit to window" selection box 540, if selected, auto fits all nodes within the window. The "max degree of separation" slide bar 545 enables a user to specify the maximum amount of separation between nodes. The "max number visible slide bar" 550 enables a user to specify the maximum number of nodes displayed. The item spacing" slide bar 555 enables a user to set the spacing between nodes. Since the chart may keep growing as the user makes further selections while keeping the "show history" option enabled, the user can utilize the one or more slide bars to customize the layout.

Turning now to the related comments area 515, when a particular node is selected, a portion of each related intention statement is shown in the window (in the same way as when the corresponding element is selected in the filters area), with relevant text highlighted in the same color as the node. In the example screen shown in FIG. 5, "kung fu" has been selected.

Therefore, a relevant portion of each of the 17 comments with "kung fu" is displayed in a scrolling window, with each instance of "kung fu" highlighted in the appropriate color for objects.

Figure 6:
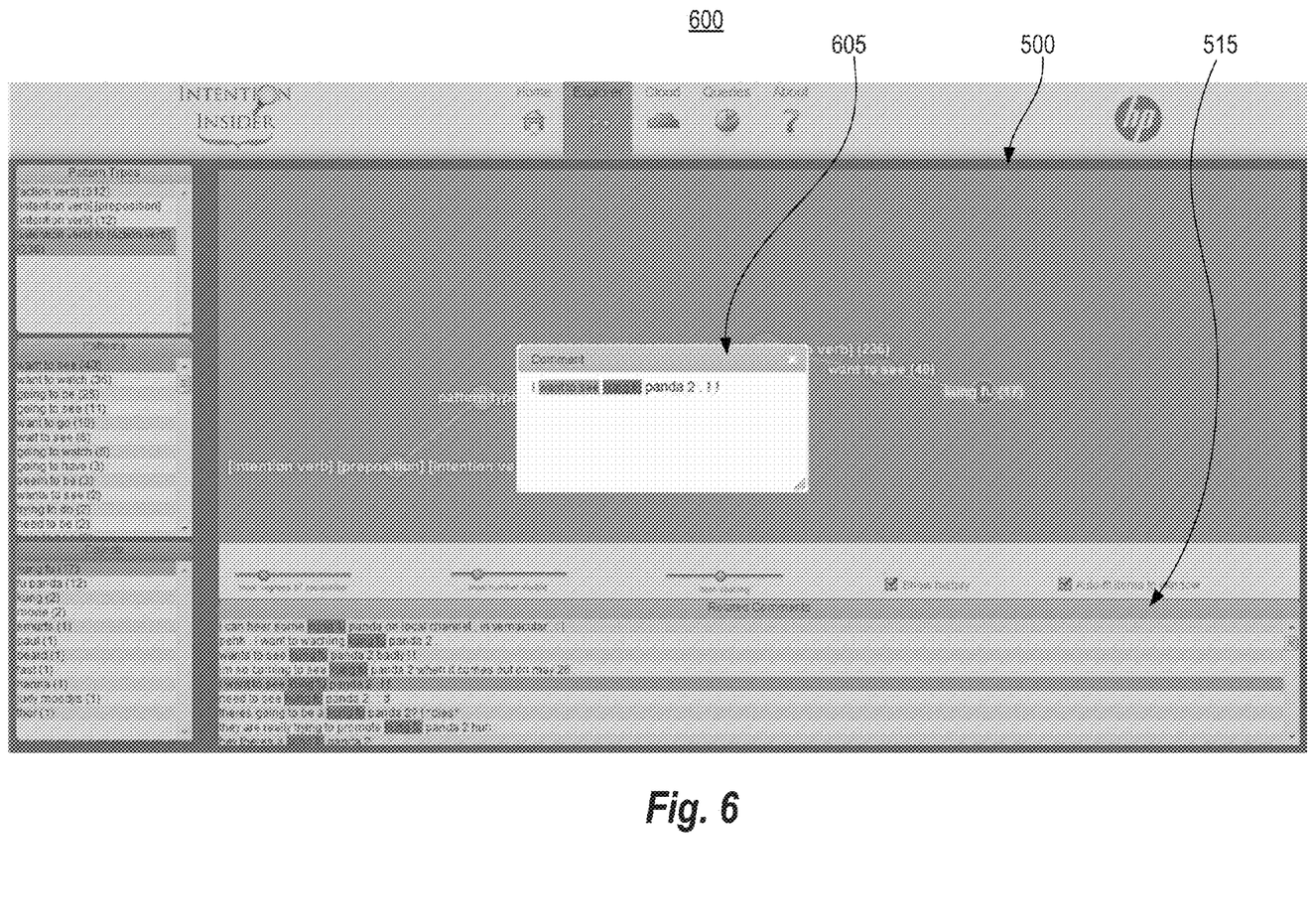
FIG. 6 depicts a third aspect of an interactive interface in accordance with an embodiment.

FIG. 6 depicts a third aspect of the interactive interface in accordance with an embodiment. In particular, FIG. 6 depicts a pop-up window 605 on the "Explorer" window 500. The pop-up window is configured to provide the full text of an intention statement in response to user selection of a particular intention statement from the related comments area 515. This enables a user to single out a single intention statement for further review, as well as see the full text of an intention statement when not completely visible in the related comments area 515. For example, in FIG. 6, the fifth comment is selected and user can see the full text of the intention statement in the pop-up box (i.e., "I want to see kung fu panda 2.!!").

Figure 7:
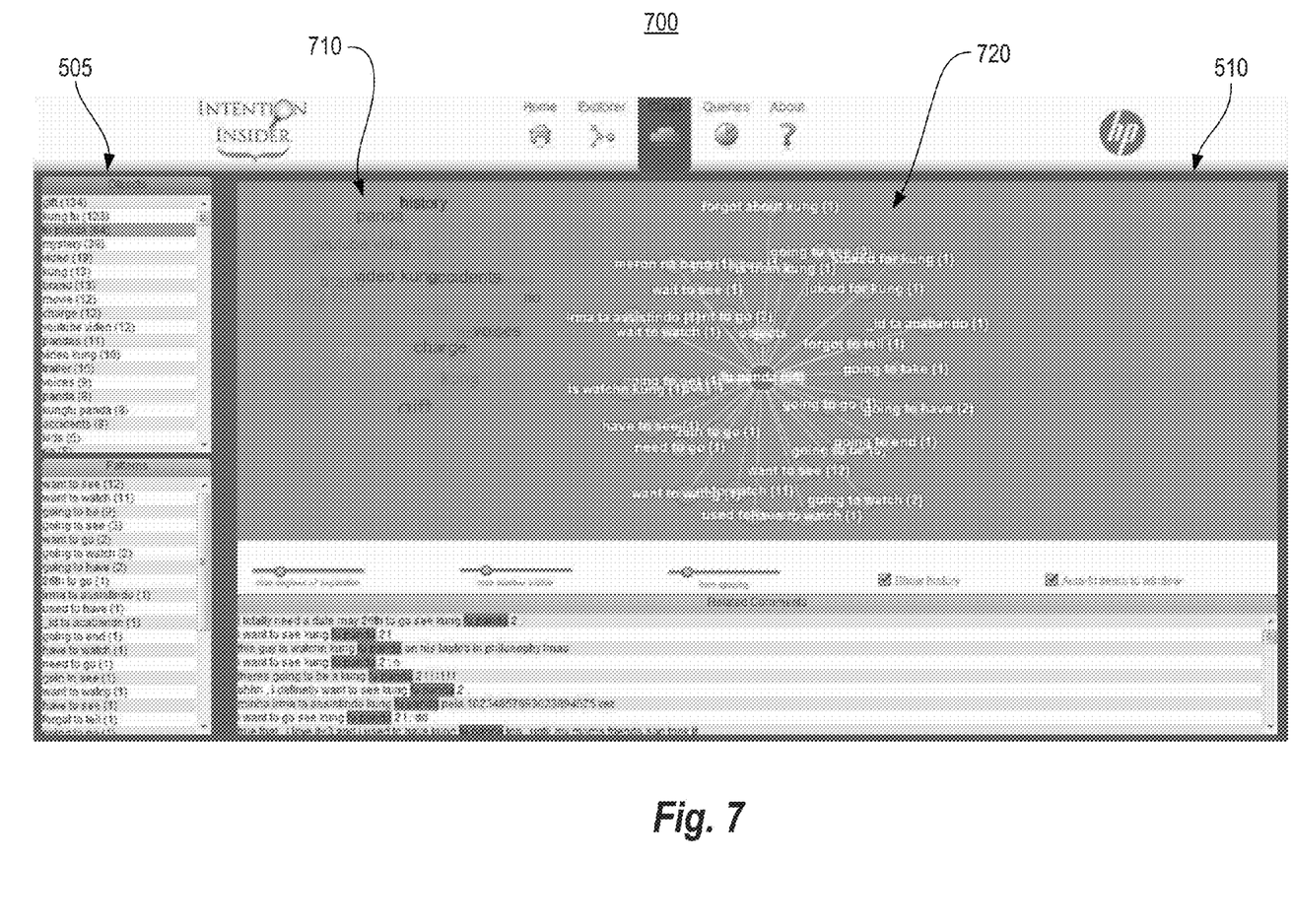
FIG. 7 depicts a fourth aspect of an interactive interface in accordance with an embodiment.

FIG. 7 depicts a fourth aspect of the interactive interface in accordance with an embodiment. In particular, FIG. 7 depicts the "Cloud" window 700, which allows the user to explore the results in another manner, namely via a tag cloud 710 and reverse nodal chart 720.

Based on the user selections within the filtering area 505, a reverse nodal chart 720 is displayed. Unlike the nodal chart shown in FIG. 5, which takes a top-down approach, the node graph in FIG. 7 takes a bottom-up approach, where the center node is a selected object (e.g., "fu panda") and the "spokes" are the various related patterns (e.g., "going to watch") and/or pattern types (e.g., "[action verb]"). Similar to as described with respect to FIG. 5, the nodes may be color coordinated and/or have a size that is a function of the number of hits.

In addition to the reverse nodal chart 720, a tag cloud 710 may also be provided in this portion of the interactive intention visualization tool. The tag cloud 710 may include the various objects related to the various patterns and/or pattern types. The size of the words in the tag cloud may be a function of the number of hits. In some embodiments, the tag cloud may continuously move (e.g., rotate the words in a circular movement). In other embodiments, the words in the tag cloud 710 may be static. Furthermore, the tag cloud may provide the user with a more convenient option to select the objects to be displayed on the reverse nodal chart given that it provides a birds-eye view of the objects and their volume.

In addition to the tag cloud 710 and reverse nodal chart 720, the Cloud window 700 may include the areas (e.g., filtering area 505 and related comments area 515), functions (e.g., pop-up windows when comments selected), and controls (e.g., show history control) as mentioned above with respect to FIG. 6.

Figure 8:
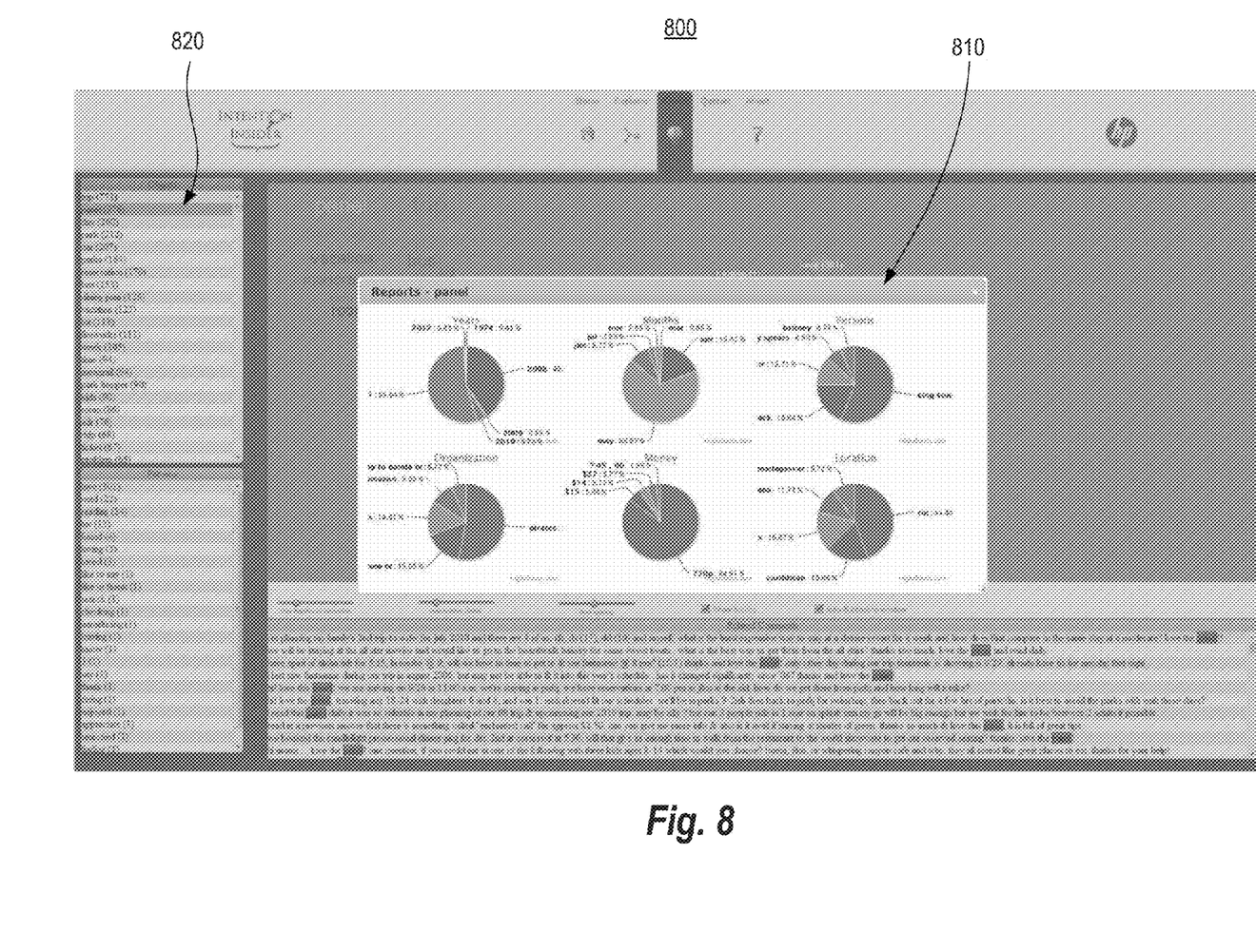
FIG. 8 depicts a fifth aspect of an interactive interface in accordance with an embodiment.

FIG. 8 depicts a fifth aspect of the interactive interface in accordance with an embodiment. In particular, FIG. 8 depicts a report window 810 that may be displayed in response to the selection of an object/pattern/pattern type. The report window 810 may provide intention-related attributes extracted by previously selected recognizers (see element 435 in FIG. 4) in the form of charts. In the example shown, the object "panel" 820 is selected. The report window 820, therefore, shows charts of attributes extracted by the selected recognizers from intention statements mentioning the object "panel" 820. Specifically, because the recognizers "years," "months," "persons," organization," "money," and "location" have been selected, charts with the data extracted by each recognizer from intention statements mentioning the object "panel" are provided with percentage of mentions information. For example, the chart for the "years" recognizer indicates that the year 2008 appeared in 40% of author comments having "panel" as object of the intention. Similarly, the chart for the location recognizer indicates that "Madagascar" was mentioned in 9.72% of the comments mentioning the intention object "panel". This information may be helpful because a viewer can quickly determine proportions of attributes about "panel" related intentions. For example, an executive viewing the "months" recognizer can quickly determine when the peak of an event (e.g., panel) may occur. In embodiments, the reports may focus on extracted data with volumes above a threshold. Thus, the reports may not include recognizers that are mentioned in only one or a few comments, and therefore not unnecessarily clutter the reports window 810.

Figure 9:
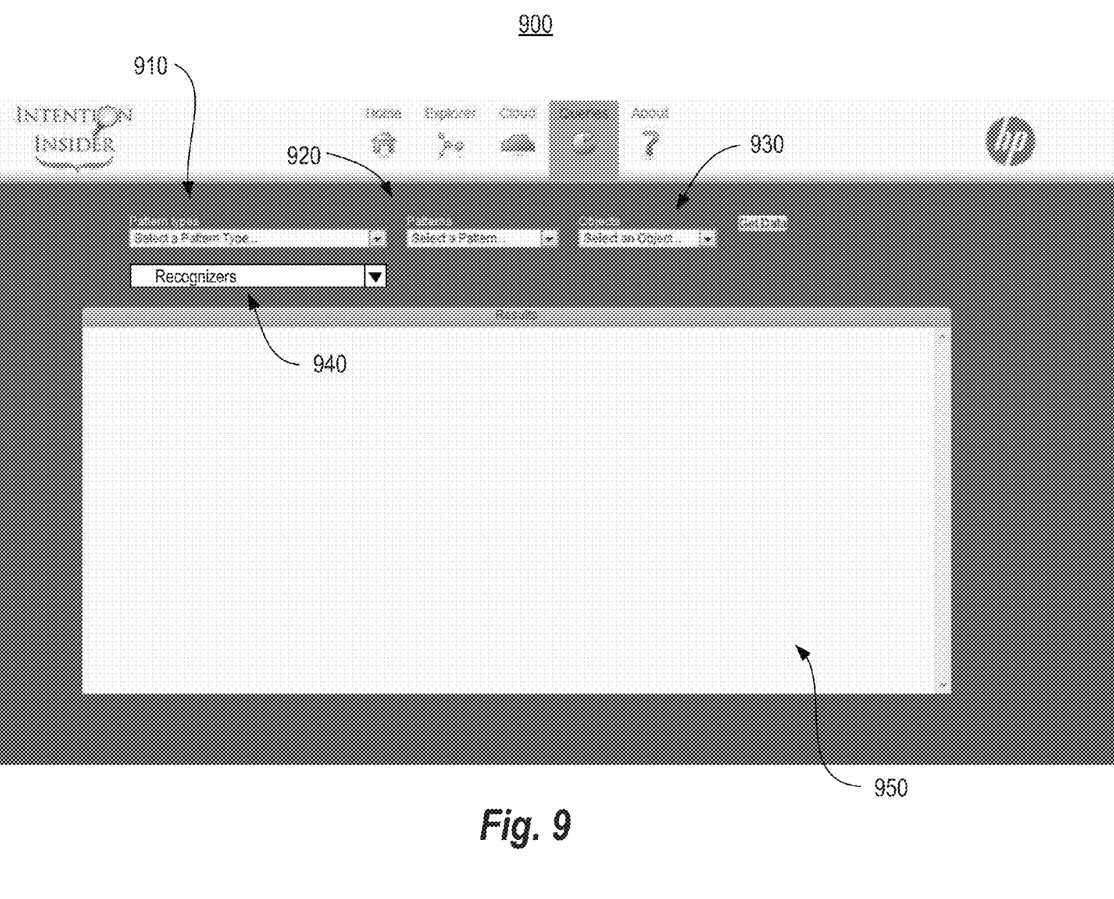
FIG. 9 depicts a sixth aspect of an interactive interface in accordance with an embodiment.

FIG. 9 depicts a sixth aspect of the interactive interface in accordance with an embodiment. In particular, FIG. 9 depicts the "Queries" window 900 that allows a user to create a custom query which will translate into a query to the database (e.g., SQL query). The query window 900 may include drop down menus such as "pattern types" 910, "patterns" 920, "objects" 930, "recognizers" 940, and the like. This window enables a user to conduct a pinpoint query on the intention text data without having to formulate the query in the database query language. For example, a user may query the "Pirates of the Caribbean" Twitter feed file (see 420 in FIG. 4) for comments with specific pattern types (e.g., [intention verb] to [action verb]), specific patterns (e.g., "want to see"), specific objects (e.g., "Johnny Depp"), and specific attributes (e.g., April) by simply doing selections on the drop down menus. The results of the query may be displayed in the results area 950 for the user to further navigate in the manner described above.

Figure 10:
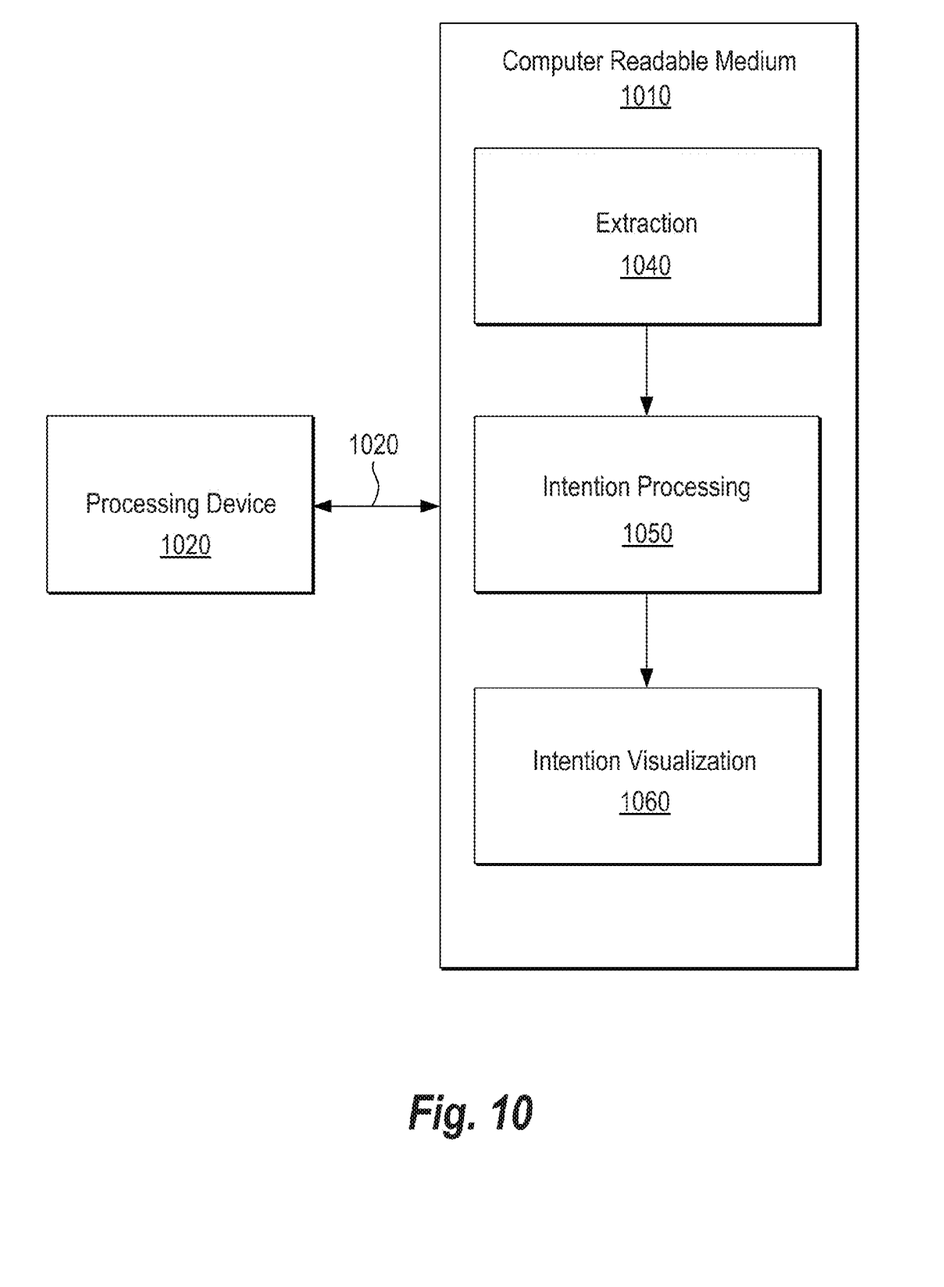
FIG. 10 depicts a non-transitory computer-readable medium in accordance with an embodiment.

FIG. 10 depicts a non-transitory computer-readable medium that stores instructions for operating an intention server in accordance with various embodiments. The non-transitory computer-readable medium is generally referenced by reference number 1010 and may be included in the intention server 140. The non-transitory computer-readable medium 1010 may correspond to any typical storage device that stores computer-implemented instructions, such as programming code or the like. For example, the non-transitory computer-readable medium 1010 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some embodiments, the instructions may be part of an installation package that can be executed by a computing device. In this case, the non-transitory computer-readable medium 810 may be a portable medium such as a CD, DVD, or flash drive or a memory maintained by a server from which the installation package can be downloaded and installed. In another embodiment, the instructions may be part of an application or application already installed. Here, the non-transitory computer-readable medium 810 can include integrated memory such as a hard drive.

A processing device 1020 generally retrieves and executes the instructions stored in the non-transitory computer readable medium 810. In an embodiment, the non-transitory computer readable medium 810 may be accesses by the processing device 1020 over a bus 1030. A first region 1040 of the non-transitory computer readable medium 810 may include extraction functionality as described herein. A second region 1050 of the non-transitory computer readable medium 810 may include intention processing functionality as described herein. A third region 1060 of the non-transitory computer readable medium 810 may include intention visualization functionality as described herein.

The present disclosure has been shown and described with reference to the foregoing exemplary embodiments. It is to be understood, however, that other forms, details, and embodiments may be made without departing from the spirit and scope of the disclosure that is defined in the following claims.

What is claimed is:

1. A system comprising:
   at least one processor;
   a non-transitory storage medium storing instructions executable on the at least one processor to:
   ingest textual data from a text source;
   process the textual data and identify an intention statement within the textual data, wherein the intention statement includes a group of words or phrases expressing an intention of an author of the intention statement to perform an action;
   provide an interactive interface that includes representations of a plurality of patterns including respective different syntaxes of intention phrases, wherein a first syntax of intention phrases of a first pattern of the plurality of patterns includes an intention verb and an action verb, and a second syntax of intention phrases of a second pattern of the plurality of patterns includes an intention verb, a preposition, and an action verb; and
   receive user selection in the interactive interface of a selected pattern of the plurality of patterns comprising the first and second patterns, wherein the identified intention statement is according to the selected pattern.

2. The system of claim 1, wherein the textual data includes user-generated online content.

3. The system of claim 1, wherein the instructions are executable on the at least one processor to provide visualization of aspects of the intention statement in the form of a tag cloud.

4. The system of claim 1, wherein the instructions are executable on the at least one processor to filter based on syntax pattern types, patterns, and objects of the intention statement.

5. The system of claim 1, wherein the instructions are executable on the at least one processor to receive a query in the interactive interface to identify intention statements according to the selected pattern of the plurality of patterns.

6. The system of claim 1, wherein the interactive interface facilitates analysis of a full text associated with the intention statement.

7. The system of claim 1, wherein the instructions are executable by the at least one processor to identify the intention statement by:
   identifying an intention verb within text in the textual data; and
   identifying an action verb associated with the intention verb, the action verb specifying the action, the intention verb and the action verb having the syntax of intention phrases of the selected pattern.

8. The system of claim 7, wherein the instructions are executable by the at least one processor to identify the intention statement by further:
   in response to identifying the intention verb, identifying attributes describing details associated with the intention statement.

9. The system of claim 1, wherein the instructions are executable on the at least one processor to:

display a nodal chart in the interactive interface, the nodal chart comprising nodes connected by an edge, wherein a first node of the nodes represents the selected pattern, and a second node of the nodes represents an object of an intention expressed according to the intention phrase of the selected pattern; and adjust a size of the first node according to a number of comments containing the intention phrase of the selected pattern, and adjust a size of the second node according to a number of comments containing the object of the intention expressed according to the intention phrase of the selected pattern.

10. The system of claim 9, wherein the instructions are executable on the at least one processor to:
receive user selection in the interactive interface of the first node or the second node; and
in response to the user selection of the first node or the second node, display at least a portion of the comments corresponding to the selected first node or second node.

11. The system of claim 9, wherein the instructions are executable on the at least one processor to:
include, in the interactive interface, representations of a plurality of different pattern types;
receive user selection in the interactive interface of a selected pattern type of the plurality of pattern types,
wherein the representations of the patterns are included in the interactive interface responsive to the selected pattern type.

12. A non-transitory computer-readable medium comprising instructions that when executed cause a system to:
present an interactive interface that includes representations of a plurality of patterns including respective different syntaxes of intention phrases;
receive user selection in the interactive interface of a selected pattern of the plurality of patterns;
process textual data and extract plural intention statements according to the selected pattern within the textual data, wherein each respective intention statement of the plural intention statements includes a corresponding group of words or phrases expressing an intention of an author of the respective intention statement to perform an action;
receive a query directed to the plural intention statements;
identify intention statements of the plural intention statements that match the query; and
output the identified intention statements that match the query.

13. The non-transitory computer-readable medium of claim 12, comprising further instructions that when executed cause the system to:
receive one or more filtering commands directed to the identified intention statements that match the query;
filter the identified intention statements that match the query based on the one or more filtering commands; and
output a result of the filtering.

14. The non-transitory computer-readable medium of claim 12, comprising further instructions that when executed cause the system to:
receive one or more selections directed to the identified intention statements that match the query;
output a nodal chart based on the one or more selections; and
output intention statement text based on the one or more selections.

15. The non-transitory computer-readable medium of claim 12, wherein the textual data is user-generated online content.

16. The non-transitory computer-readable medium of claim 12, comprising further instructions that when executed cause the system to:
identify each respective intention statement of the plural intention statements by:
identifying an intention verb within text in the textual data; and
identifying an action verb associated with the intention verb, the action verb specifying the respective action, the intention verb and the action verb having the syntax of intention phrases of the selected pattern.

17. The non-transitory computer-readable medium of claim 12, wherein a first syntax of intention phrases of a first pattern of the plurality of patterns includes an intention verb and an action verb, and a second syntax of intention phrases of a second pattern of the plurality of patterns includes an intention verb, a preposition, and an action verb, and wherein the received user selection of the selected pattern is a selection from the plurality of patterns comprising the first and second patterns.

18. A method comprising:
presenting, by a system including a processor, an interactive interface that includes representations of a plurality of patterns including respective different syntaxes of intention phrases;
receiving, by the system, user selection in the interactive interface of a selected pattern of the plurality of patterns; and
extracting, by the system, intention statement information from textual data, the intention statement information including an intention statement according to the selected pattern and comprising a group of words or phrases expressing an intention of an author of the intention statement to perform an action, wherein a first syntax of intention phrases of a first pattern of the plurality of patterns includes an intention verb and an action verb, and a second syntax of intention phrases of a second pattern of the plurality of patterns includes an intention verb, a preposition, and an action verb, and wherein the selected pattern is one of the first and second patterns.

19. The method of claim 18, wherein the textual data includes data from an online forum or a social networking website.

20. The method of claim 18, wherein the textual data includes uploaded textual data or textual data that is harvested from one or more websites.

21. The method of claim 18, further comprising:
identifying, by the system, the intention statement in the textual data by:
identifying an intention verb within text in the textual data; and
identifying an action verb associated with the intention verb, the action verb specifying the action, the intention verb and the action verb having the syntax of intention phrases of the selected pattern.

22. A method comprising:
presenting, by a system including a processor, an interactive interface that includes representations of a plurality of patterns including respective different syntaxes of intention phrases;
receiving, by the system, user selection in the interactive interface of a selected pattern of the plurality of patterns; and
extracting, by the system, intention statement information from textual data, the intention statement information including an intention statement according to the selected pattern and comprising a group of words or phrases expressing an intention of an author of the intention statement to perform an action;

displaying a nodal chart in the interactive interface, the nodal chart comprising nodes connected by an edge, wherein a first node of the nodes represents the selected pattern, and a second node of the nodes represents an object of an intention expressed according to the intention phrase of the selected pattern; and adjusting a size of the first node according to a number of comments containing the intention phrase of the selected pattern, and adjust a size of the second node according to a number of comments containing the object of the intention expressed according to the intention phrase of the selected pattern.

23. The method of claim 22, further comprising:

receiving user selection in the interactive interface of the first node or the second node; and in response to the user selection of the first node or the second node, displaying at least a portion of the comments corresponding to the selected first node or second node.

\* \* \* \* \*